US005319362A

United States Patent [19]

Hyatt, Jr.

[11] Patent Number: 5,319,362

[45] Date of Patent: Jun. 7, 1994

[54] SECURITY SYSTEM WITH SECURITY ACCESS DATABASE DISTRIBUTED AMONG INDIVIDUAL ACCESS DEVICES

[75] Inventor: Richard G. Hyatt, Jr., Salem, Va.

[73] Assignee: Medeco Security Locks, Inc., Salem, Va.

[21] Appl. No.: 961,025

[22] Filed: Oct. 14, 1992

Related U.S. Application Data

[63] Continuation of Ser. No. 537,724, Jun. 14, 1990, abandoned.

[51] Int. Cl.[5] .......................... G06F 7/04; E05B 45/06; G06K 7/01

[52] U.S. Cl. .......................... 340/825.31; 340/825.32; 340/825.34; 340/542; 235/382.5

[58] Field of Search ........... 340/825.19, 825.3, 825.31, 340/825.32, 825.33, 825.34, 542; 235/382.5; 70/268, 274, 283

[56] References Cited

U.S. PATENT DOCUMENTS 3,836,754 9/1974 Toye et al. .......................... 235/469
3,941,977 3/1976 Voss et al. ...................... 340/825.33
4,408,122 10/1983 Casden ................................ 235/449
4,438,426 3/1984 Adkins ........................... 340/825.32
4,644,484 2/1987 Flynn et al. .................... 340/825.31
4,697,171 9/1987 Suh .
4,738,334 4/1988 Weishaupt .
4,766,746 8/1988 Henderson et al. ............ 340/825.31
4,789,859 12/1988 Clarkson et al. ............... 340/825.31
4,839,640 6/1989 Ozer et al. ....................... 340/825.31
4,870,400 9/1989 Downs et al. .................. 340/825.34
4,909,053 3/1990 Zipf, III et al. ....................... 70/283
5,014,049 5/1991 Bosley ............................ 340/825.31

*Primary Examiner*—Donald J. Yusko
*Assistant Examiner*—Mark H. Rinehart
*Attorney, Agent, or Firm*—Rothwell, Figg, Ernst & Kurz

[57] ABSTRACT

An electronic security system includes a controller for controlling access to a location through activation of a lock mechanism in response to coded data and command instructions read from a key or card containing an electronic memory. The key memory data includes information specific to the keyholder which is decoded and acted upon by the controller. The controller memory can be reduced in size while still allowing the use of a large number of keys, by distributing a larger amount of data to the key memories. The controller is also capable of writing and altering key memory data in real time to control the subsequent use of the key.

16 Claims, 10 Drawing Sheets

SECURITY SYSTEM WITH SECURITY ACCESS DATABASE DISTRIBUTED AMONG INDIVIDUAL ACCESS DEVICES

This is a continuation of application Ser. No. 537,724, filed Jun. 14, 1990 now abandoned.

BACKGROUND OF THE INVENTION

1. Field of the Invention

This invention relates generally to microprocessor based security systems, and more particularly to electronic security systems in which a security code is electronically read from a key or access card.

BACKGROUND AND PRIOR ART

Electronic security systems in which a lock and a key are each provided with a memory device having security or ID codes stored therein are known in the art, see e.g. U.S. Pat. Nos. 4,697,171, 4,738,334, 4,438,426 and 4,789,859.

Presently known electronic security systems are restricted in terms of keyholder-specific response features, and the impact of lost keys on system integrity. For example, a conventional electronic key contains a security or ID code stored in memory which corresponds to an ID code stored in the memory of the lock control mechanism. In a security system for a building accommodating hundreds or even thousands of employees, the loss of a single key is particularly burdensome. Typically, the lock controller memory is limited by size and cost considerations, so that the number of different codes capable of being stored is also limited to less than the number of keys needed. The loss of a key may thus necessitate the replacement or reprogramming of hundreds of keys which have the same ID code as the lost key, since the code must be changed in the controller memory to ensure system integrity.

In addition, conventional electronic door locks operate by powering a lock relay for a predetermined number of seconds after a valid key has been presented, during which time the door must be opened by the keyholder. This is particularly inconvenient for handicapped or aged individuals who may not be physically able to gain access in the allotted time. On the other hand, security considerations require that a door not remain unlocked for too long a time period, which would enable an unauthorized person to enter immediately after a valid keyholder has passed through.

In very large buildings such as shopping malls, in which there are a great number of entrances, exits, emergency exits, and freight entrances, there exists the possibility that a particular access door will be overlooked by security personnel responsible for unlocking the facility at the start of the business day and locking up at night. Thus, potentially dangerous situations may arise where a fire or emergency exit has not been unlocked, or conversely a side entrance or exit may be left unlocked overnight.

Another concern is the possibility of wrongdoing on the part of personnel. For instance, an unauthorized person may gain access to a high security building by using an employee's key or electronic card which has been obtained from an employee already in the building by "passing back" of the key or card to the unauthorized person under a door or through a window.

Another potential problem exists with respect to the issuance of visitor keys or cards to temporary persons such as visitors and service personnel, who may fail to return the visitor key upon leaving the building.

SUMMARY OF THE INVENTION

The present invention overcomes the problems noted above by providing a security system in which a key or card is provided with a memory having stored therein specific coded data and selected command instructions, and in which a controller is provided for controlling the access of a keyholder to a location including a reader for reading the coded data and command instructions from the key or card, determining the validity of the key based on the content of the coded data read from the key memory, allowing access to the location upon the determination of the key to be valid, and responding to the command instructions read from the valid key. The command instructions can be custom programmed into the key based on the needs of the particular holder, such as a command to increase the amount of time that a door relay remains activated to allow a handicapped person enough time to enter, or a command to override the requirement for a keyholder to enter a personal identification number (PIN) on a key pad in addition to presenting a key or card to a reader device.

The present invention further provides a security system in which validation time data is stored in a key memory, and is compared with current time and date at the controller to determine whether the key is still valid.

The present invention further provides a security system including the capability for writing coded data into the memory of a key presented to a reader device "on the fly" so as to write the location of the reader into the key memory to control the subsequent use thereof.

The present invention further provides a security system having the capability of determining whether a door has been forced or propped open and activating an alarm in response to such a condition.

The invention further provides a method of controlling access to a location comprising the steps of storing coded data and commands in the memory of a key, reading the coded data and commands from the key memory, and determining the validity of the key based on the coded data read from the memory, and allowing access to the location and responding to the commands when the key is determined to be valid.

BRIEF DESCRIPTION OF THE DRAWING

The present invention will become more fully understood from the detailed description given hereinbelow and the accompanying drawings which are given by way of illustration only, and are not limitative of the present invention, and wherein.

DETAILED DESCRIPTION OF THE PREFERRED EMBODIMENTS

Figure 1:
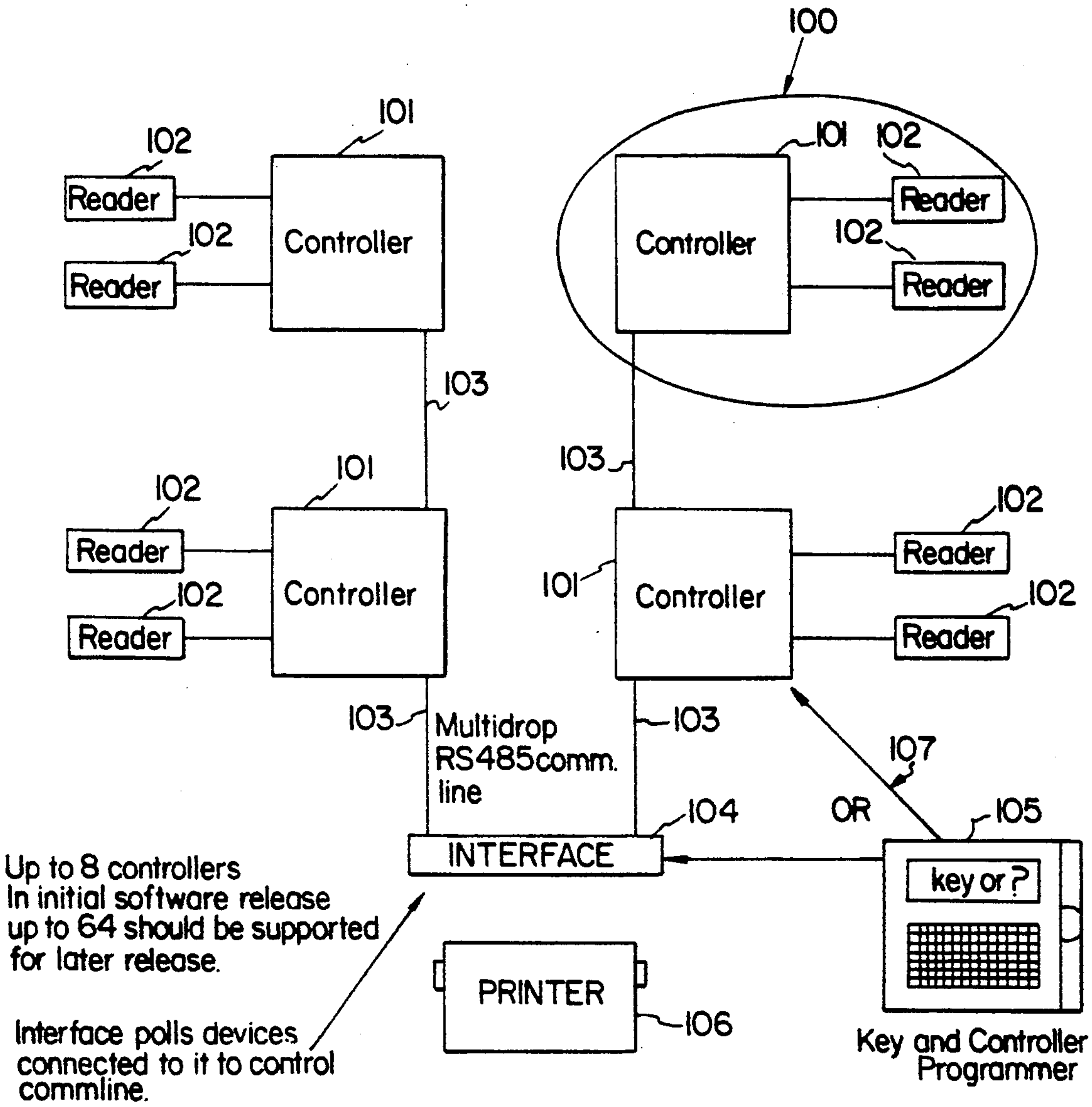
FIG. 1 is a block diagram of the basic configuration of an electronic security system according to one preferred embodiment of the present invention.

FIG. 1 is a block diagram of the basic configuration of one preferred embodiment according to the present invention.

The basic unit 100 of the present security system includes a controller 101 containing standard logic circuitry including a microprocessor, ROM, RAM, a clock oscillator, and input/output interfaces. An individual controller 101 may support up to two electronic key or card reader devices 102. Individual controllers may be connected by communication lines 103 and networked to a master key and controller programmer unit 105 via an interface circuit 104. A printer 106 can be connected to the interface unit 104 to provide data printouts. The programmer unit 105 can also be connected to each controller 101 individually through a separate communication line 107. In operation, controller programmer 105 polls the individual controller devices 101 through interface 104 to coordinate communication priority among controllers.

Figure 7A:
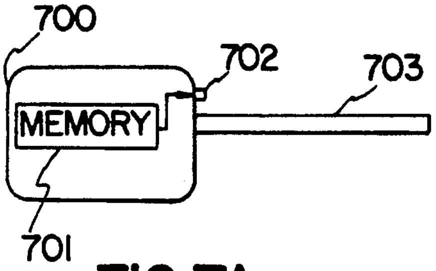
FIGS. 7A and 7B are side and end views, respectively, of a key device according to one embodiment of the present invention.
Figure 7B:
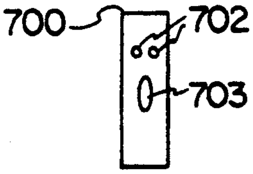

FIG. 7A is a side view of a key device according to one preferred embodiment of the present invention. Key body 700 includes a memory 701, which may be an electrically erasable programmable read only memory (EEPROM) and which is connected to external contact terminals 702. The key further includes a key blade 703. In the preferred embodiment, key blade 703 does not have any mechanical key cuts but is merely used to guide the key into a reader device. However, key cuts may be used in addition to the electronic security code. FIG. 7B is an end view of the key 700.

Figure 8:
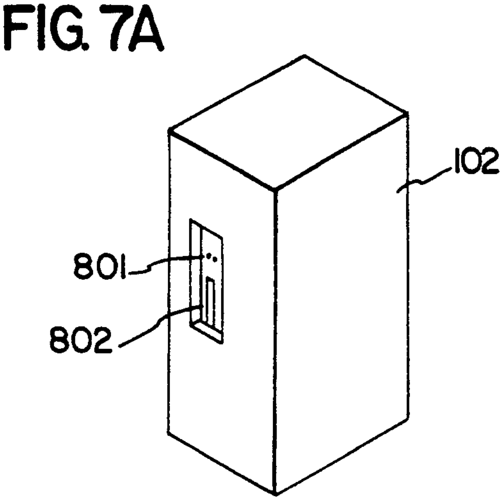
FIG. 8 is a conceptual perspective view of a key reader device of one preferred embodiment according to the present invention.

FIG. 8 is a perspective view of a reader device 102. Contact terminals 801 make contact with terminals 702 on the key body when key blade 703 is inserted into keyway 802.

Figure 9:
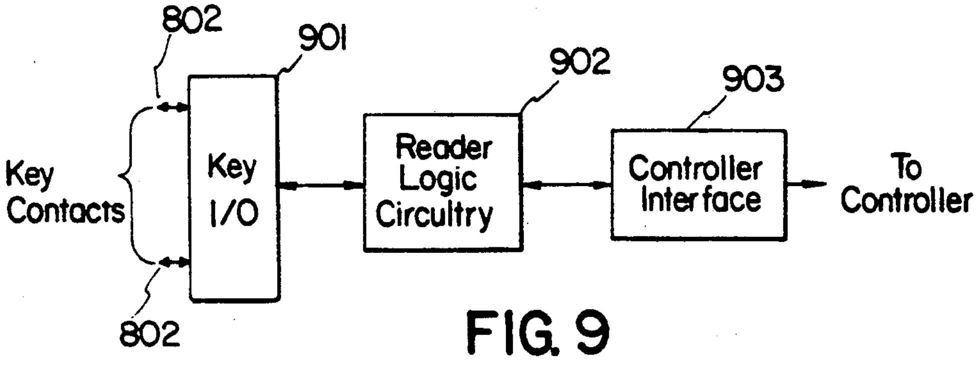
FIG. 9 is a block diagram illustrating the components of the reader device of FIG. 8.

FIG. 9 is a block diagram of the components of reader device 102. Key input/output interface 901 transmits data and command instructions from memory 701 to the reader logic circuitry 902, which typically includes a microprocessor, RAM and buffer memories. Data is communicated to the controller 101 via a controller interface unit 903.

Figure 2:
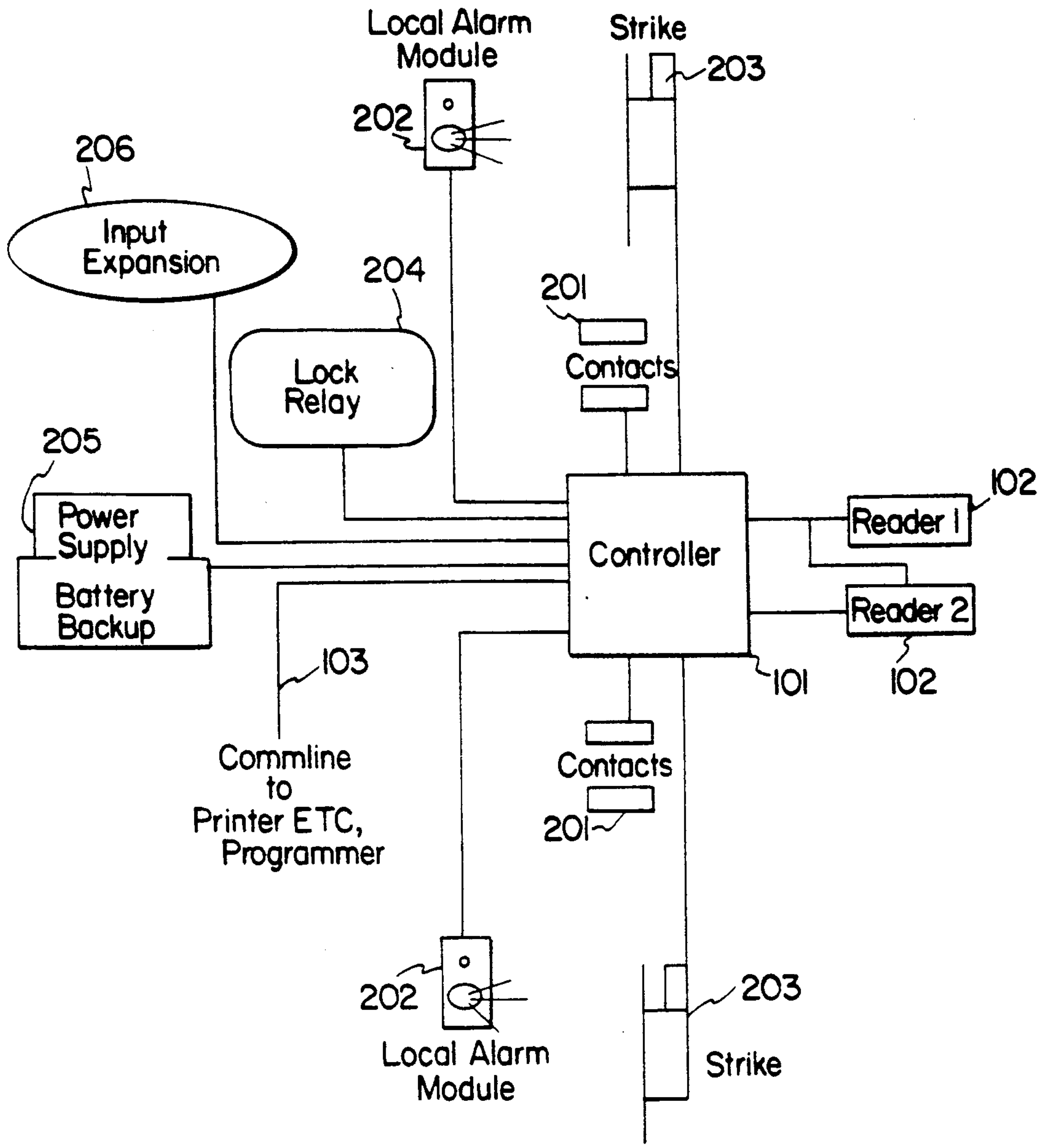
FIG. 2 is a detailed block diagram of the components of the individual controllers of FIG. 1.

FIG. 2 is a detailed block diagram of the configuration of the basic control unit 100. Besides reader device 102, the controller 101 is further connected to contact sensors 201 for sensing the condition of doors associated with reader devices 102, and is further connected to local alarm modules 202, which are activated upon the detection of a door to be either forced or propped open. Rex switch 203 (FIG. 3) may be provided at the interior side of the door, which send a request to exit (REX) signal to the controller when actuated by a user wishing to exit from the controlled access location. The controller 101 is connected to a lock relay switch 204 which activates a relay to unlock a door when a valid key is presented to reader 102. Controller 101 is also provided with a battery backed-up power supply 205, and also contains an expansion port 206 which is connectable to additional peripheral devices for future system upgrading.

Figure 3:
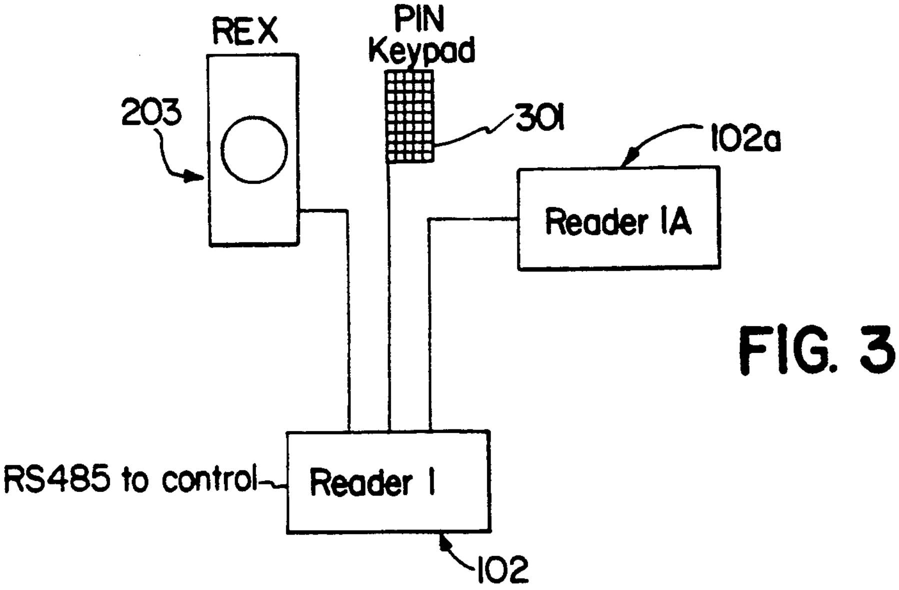
FIG. 3 is a block diagram illustrating the use of a master/slave card reader configuration.

FIG. 3 illustrates another preferred embodiment in which a master reader 102 is connected to a slave reader 102*a*, as well as to a request to exit (REX) switch 203 and a PIN keypad 301. By connecting a slave reader 102*a* directly to a master reader 102, the number of wire connections of the system may be significantly reduced. The PIN keypad can be used for entering a keyholder's personal identification number in addition to presenting his or her key at the reader device 102 for increased security. The user's PIN is stored in the key memory 701 and is compared with a PIN entered through the keypad 301 to determine whether the keyholder is authorized to possess the key.

The operation of the system will now be described with reference to FIGS. 4A–4E.

Among the data stored in the key memory 701 is a security or ID code corresponding to an ID code stored in a memory table within the controller 101, a key validation start date and expiration date, a keyholder PIN, the keyholder's name, a key identification number, and various command instructions which modify the controller's response to the presentation of a valid key.

At step 401, the key 700 is presented to the reader 102, and the data in memory 701 is read by the reader logic circuitry. At step 402, the reader transmits the read data to the controller 101 via the controller interface 903. At step 403, the controller 101 decrypts the encrypted data and compares the security code against the security code table stored in its memory. If the security code read from the key does not correspond to any of the codes in the table, processing advances to step 409 at which the key is rejected and an appropriate message is sent by the controller to printer 106, if connected to the system.

If the security code from the key corresponds to a code in the table, processing proceeds to step 404 at which the validation start date read from the key is compared with the current date as read from the internal system clock. If the current date is subsequent to the validation date, processing proceeds to step 405 at which the expiration date is compared with the current date. At step 406, the controller compares a key identification number against a table of key identification numbers which are valid for the specific reader to which the key is presented. At steps 407 and 408, the key identification number is compared against a time restriction table to determine whether the key is valid for that particular day and time or holiday if applicable. If the results of any of the comparisons is negative, processing immediately advances to step 409 in which the key is rejected, and no further action is taken.

Figure 4D:
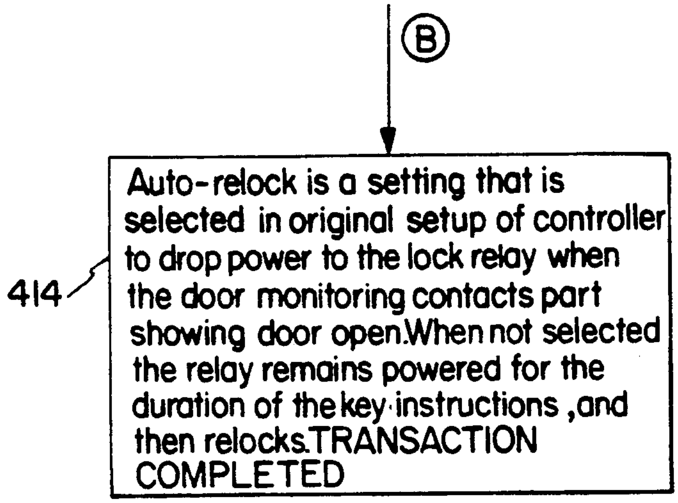
FIGS. 4A–4E are flowcharts explaining the general operations of the controller.
Figure 4A:
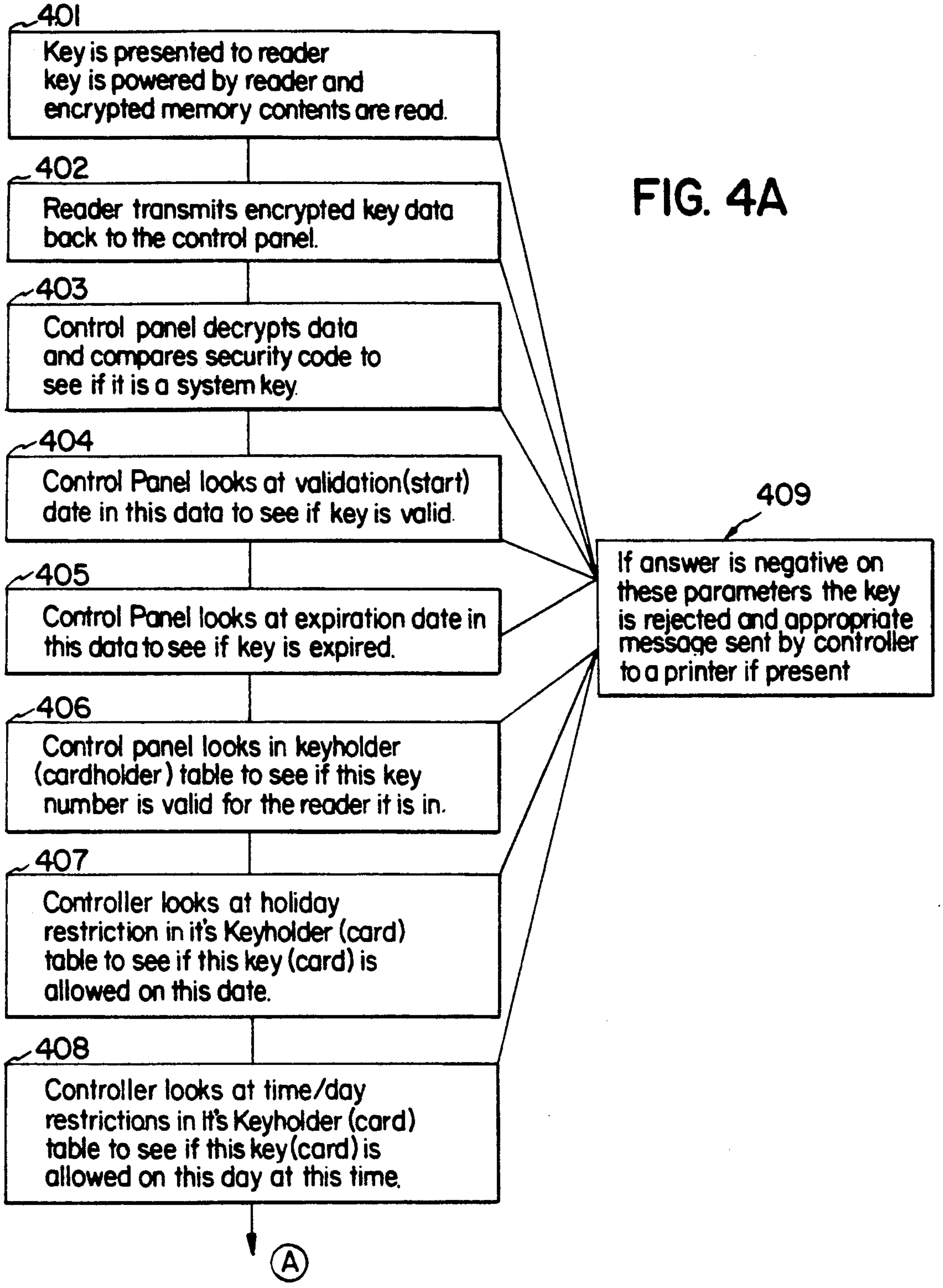
Figure 4B:
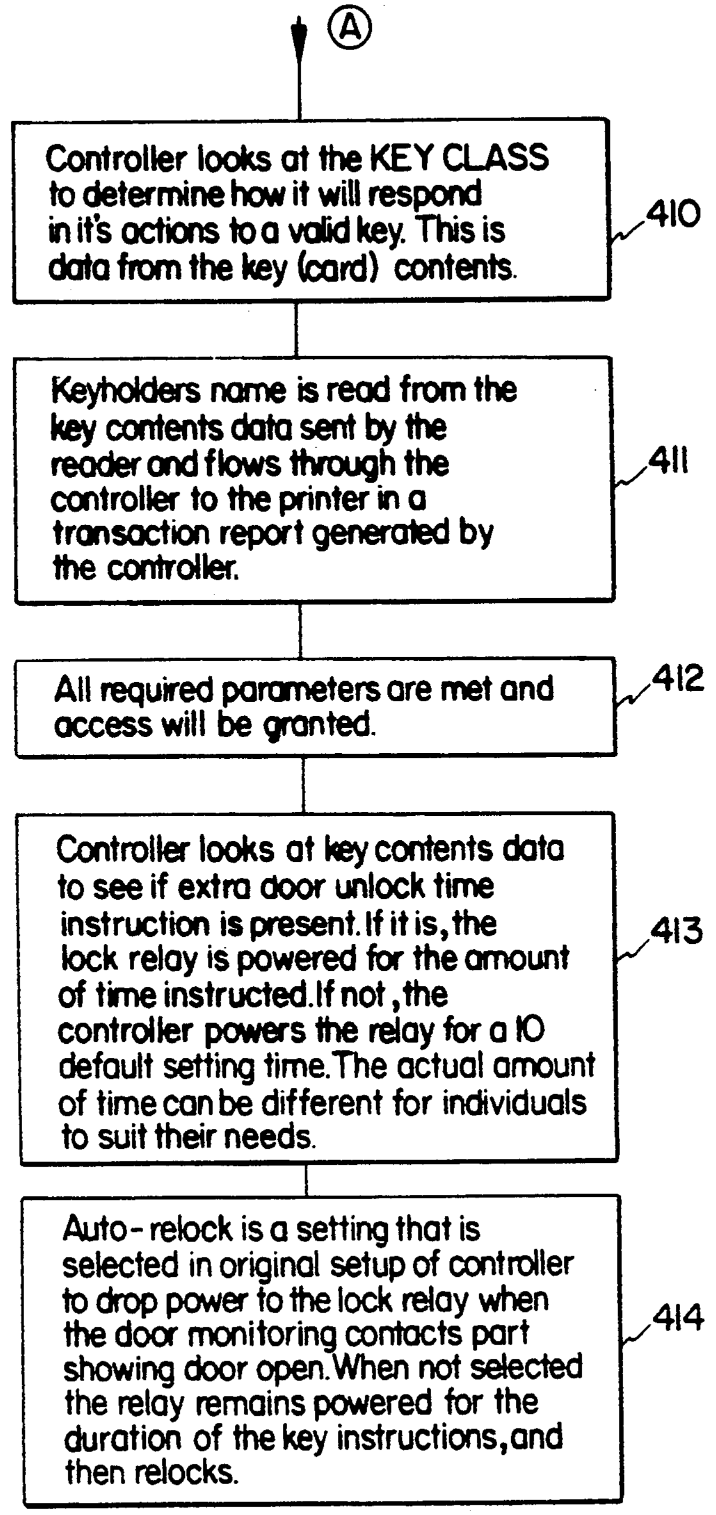

Processing continues to step 410 as shown in FIG. 4B. In this step, the data read from the key memory is checked to determine the key class. The key class corresponds to a command instruction which will be executed by the controller if the key is determined to be valid. For example, a Class 1 key would denote a regular key having no program effect on the controller, a Class 2 key denotes that the keyholder is handicapped and instructs the controller to override PIN keypad entry verification and an auto-relock feature described below. A Class 3 key denotes that the keyholder is management and instructs the controller to override antipassback features and PIN keypad entry verification. A Class 4 key is not presented to unlock a door but instructs the controller to override any automatic time controlled lock operation, for example, in which the lobby doors of a building automatically unlock in the morning and lock in the evening. The Class 4 key is intended to prevent the automatic unlocking of doors in the event of an emergency such as a power outage or inclement weather conditions, in which case the key would be inserted into the appropriate reader by security personnel. A Class 8 key denotes a key instructing the controller to reset its automatic lock time control when overridden by a Class 4 key.

At step 411, the keyholder's name is read from the key memory data, which can be utilized in a transaction report printout showing the name, location, and time of access. At step 412, all required key parameters are determined to be met and access will be allowed. At step 413, the controller looks for an extra door unlock time instruction. If the key contains such an instruction, the door lock relay is powered for the amount of time indicated in the instruction. If no such command is present, the controller powers the lock relay for a default time period such as 10 seconds. The specific unlock time can be varied according to the needs of the particular keyholder.

At step 414, the controller monitors the door condition and immediately deactivates the lock relay upon sensing that the door has been opened, so that the door does not remain unlocked after access has been gained but is automatically relocked upon closure. If the controller has determined the key to be a Class 2 or handicapped key, the auto-relock feature will be overridden and the relay will remain powered for the amount of time read at step 413.

Figure 4C:
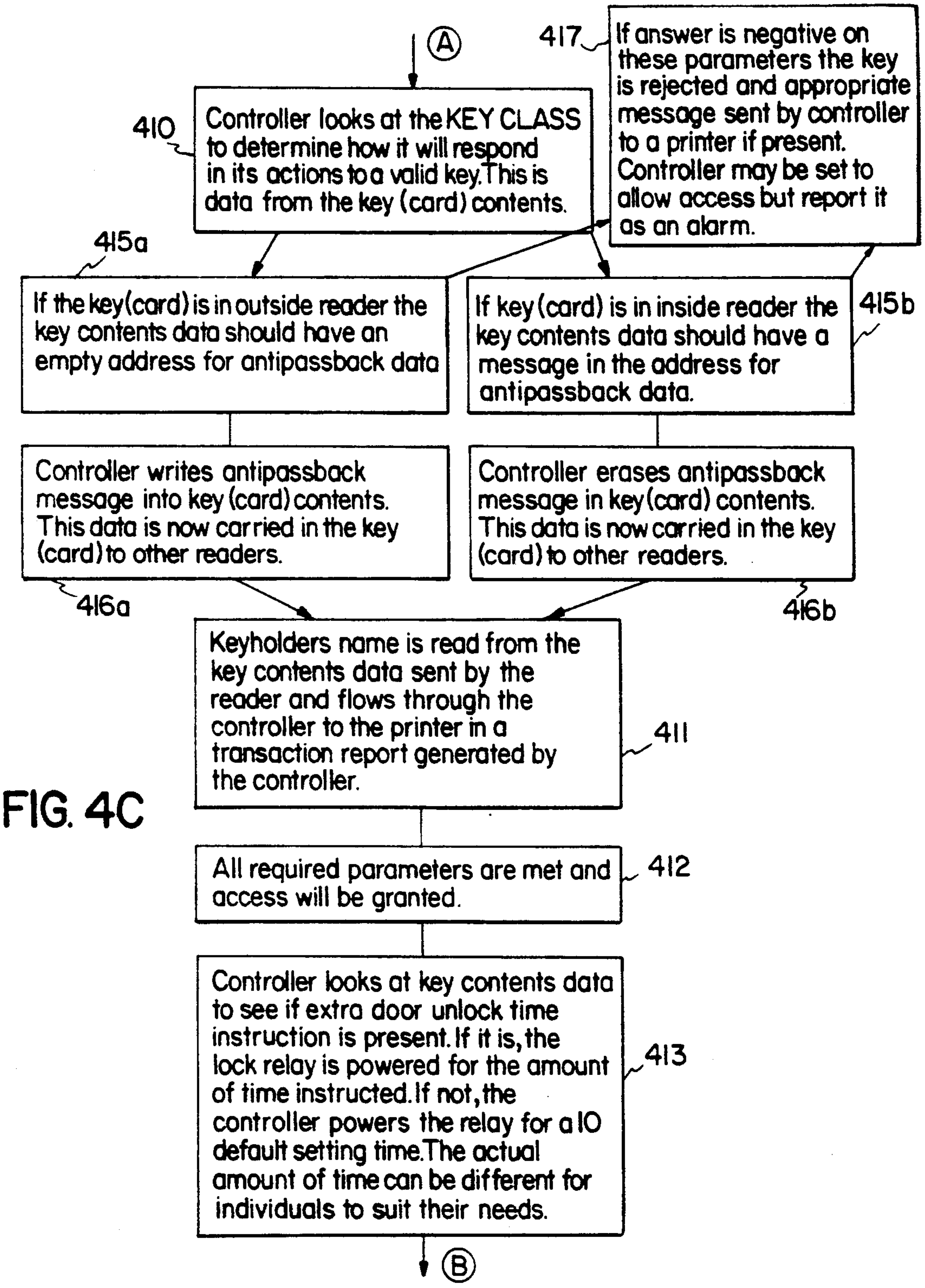

FIG. 4C is a flowchart explaining the optional antipassback feature. The antipassback feature prevents a keyholder from entering a location and passing his or her key back to a potentially unauthorized person. The antipassback feature requires the use of a reader device at both the exterior and interior door locations.

Identical steps of FIG. 4C are numbered the same as those of FIG. 4B and will not be repeated. If the controller has determined the reader device at which the key is presented to be an exterior reader, processing proceeds to steps **415*a* and 416*a*. At step 415*a*, the key memory antipassback data address is checked to determine whether it is empty. If the antipassback memory location contains a message, this denotes that the key was last used in an outside reader and therefore has been passed back to another party, and accordingly processing proceeds to step 417 at which the key is rejected and appropriate action is taken by the controller, such as activating an alarm or sending a message to the master programmer. If the antipassback location is empty, processing proceeds to step 416*a*** in which the controller writes an antipassback message into the antipassback memory address.

If the reader device at which the key is presented is determined to be an inside reader, the controller advances to step **415*b* in which the antipassback memory location is checked for the presence of an antipassback message. If the antipassback location is empty, it is determined that the key was previously used at an inside reader and processing advances to step 417 at which the key is rejected and appropriate action taken. If the proper antipassback message is present in the key memory location, processing advances to step 416*b* at which the antipassback message is erased. The remaining steps 411 to 413 and 414 as shown in FIG. 4D are identical to FIG. 4B**.

The same processing steps can be used when a specific sequence of operation is required, such as the sequential unlocking or locking of a plurality of doors in a large building or shopping mall. In such case, the key memory is checked at a specific address to determine whether the key has been presented to the required reader before being inserted into the current reader. If so, the data is replaced by writing new data identifying the current reader into the key memory.

Figure 4E:
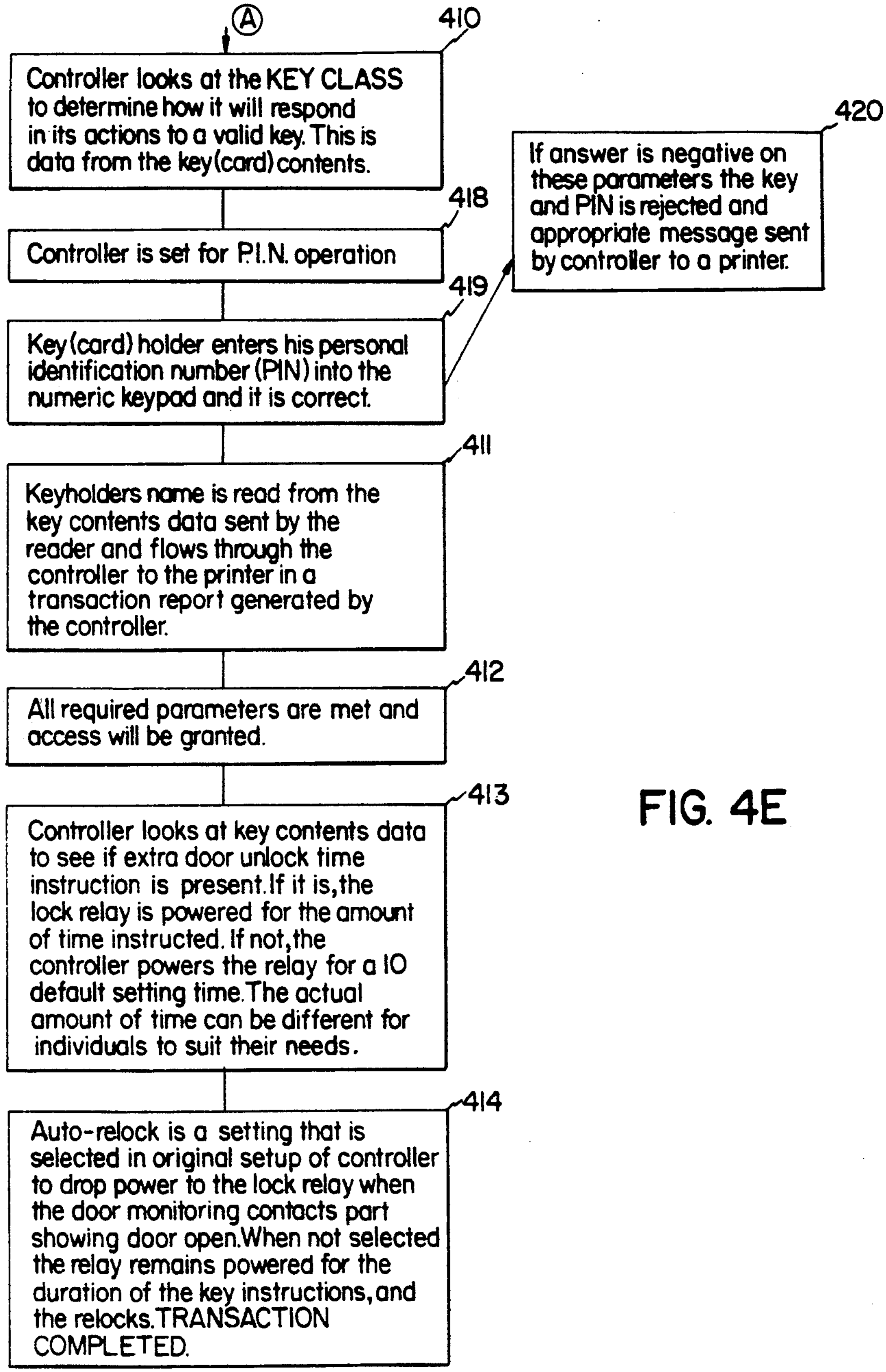

FIG. 4E illustrates an alternative embodiment in which a PIN verification is carried out. At step 418, the controller determines that a PIN is required. At step 419, the controller waits for the keyholder to enter his or her PIN via the numeric keypad. If the PIN is correct, processing advances to steps 411–414. If the PIN is incorrect, processing advances to step 420 in which the key is rejected, and further appropriate action is taken.

It is to be noted that the antipassback and PIN processing features can be utilized together as well as individually as described above.

Figure 5:
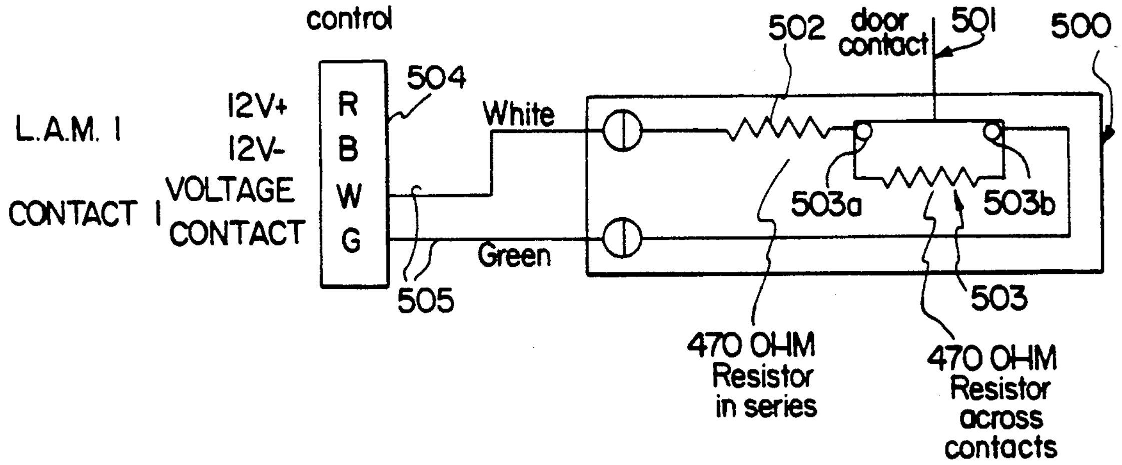
FIG. 5 is a schematic diagram of a door sensor circuit according to one preferred embodiment of the present invention.

FIG. 5 is a schematic block diagram illustrating one preferred embodiment of a door sensor 500 for determining the condition of a door, including a door contact switch 501, a resistor 502 in series with the door contact switch 501, and a resistor 503 in parallel with switch 501. The sensor 500 is connected to a controller input terminal 504 via a pair of conductors 505. The opening of a door causes contact switch 501 to make contact with terminals **503*a* and 503*b*, thus shorting out resistor 503 from the remainder of the circuit, causing a higher voltage to be applied to the controller via terminal 504 which indicates that the door is open. Conversely, upon door closure switch 501 breaks contact with terminals 503*a* and 503*b* causing resistor 503 to be in series with resistor 502 thereby reducing the voltage applied to the controller logic terminal 504**.

Figure 6:
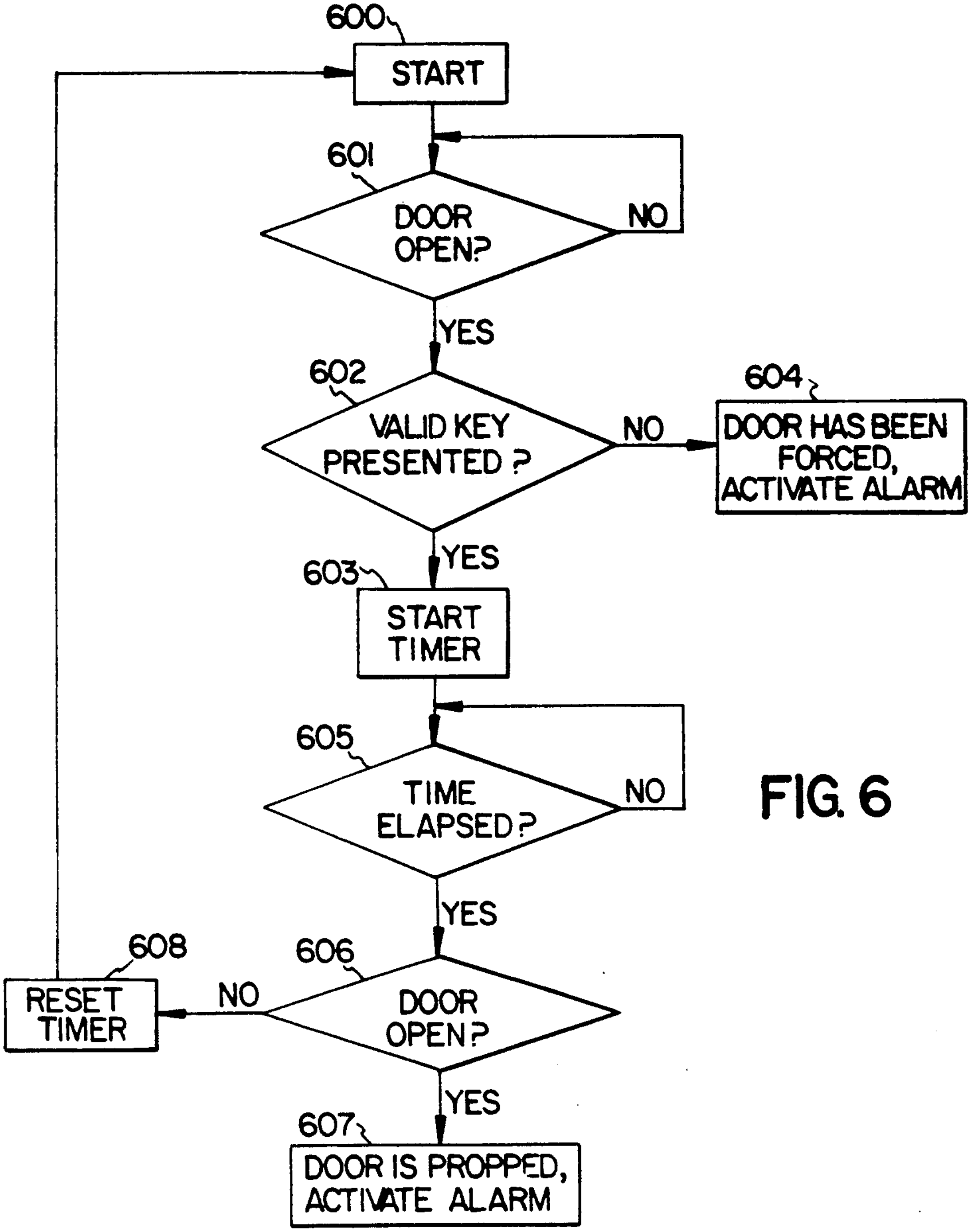
FIG. 6 is a flowchart for explaining the operation of door position sensing.

The door sensing operation will be described with reference to the flowchart of FIG. 6. At step 600, the controller is powered up and processing advances to step 601 at which the controller periodically monitors the voltage appearing at terminal 504 to determine whether the door has been opened. Upon detecting that the door has been opened, processing advances to step 602 at which the controller determines whether a valid key has been presented at the corresponding key reader, by checking whether the main processing routine has advanced to step 412. If a valid key has been presented, processing advances to step 603 at which a timer is started. If a valid key has not been presented to the reader, processing advances to step 604 at which it is determined that the door has been forced open, and an alarm is activated. At step 605, the controller determines whether a predetermined time has elapsed since the door has been validly opened. After such predetermined time, processing advances to step 606 at which it is detected whether the door is still open. If the result of step 606 is positive, processing advances to step 607 at which it is determined that the door is propped open, and an appropriate alarm is activated. If the result of step 606 is negative, the timer is reset at step 608 and processing returns to step 600 to repeat the door monitoring procedure.

The invention being thus described, it will be apparent to those skilled in the art that the same may be varied in many ways without departing from the spirit and scope of the invention. Any and all such modifications are intended to be included within the scope of the following claims.

What is claimed is:

1. A security system, comprising:

key means for gaining access to a location, including a memory having stored therein specific coded data including a security code and additional validation data specific to said key means, and selected command instructions related to access requirements specific to an authorized keyholder assigned to said key means; and controller means for controlling access to said location, including means for reading said coded data and command instructions from said key means, means for determining the validity of said key means based on the content of the coded data read from said key means, means for allowing access to said location upon determining said key means to be valid, and means for responding to command instructions read from a key means determined to be valid in order to provide a mode of access in accordance with said access requirements.

2. The security system of claim 1, wherein said controller means further includes means for writing coded data into the memory of said key means to control the subsequent use thereof.

3. The security system of claim 2, wherein the coded data written into said key means memory comprises data identifying the location at which said key means has been presented, said controller means further including means for determining a specific operating sequence of said key means by location, said validity determining means determining said key means to be invalid if presented to a location out of said sequence.

4. The security system of claim 2, wherein said means for reading comprises a key means reader at both an entrance and an exit of said location, said coded data written into the memory of said key means including information identifying the reader at which said key means was last used, said key means being determined invalid if said key means is presented to the same reader twice in succession.

5. The security system of claim 4, further comprising means for altering reader identifying information previously stored in said key means memory when said key means is determined to be valid.

6. The security system of claim 1, wherein said additional validation data includes a validation start date and expiration date, said controller means further including a memory and a clock, said key means being determined valid if said security code corresponds to a previously stored security code in said controller means memory and if the current date determined from said clock is within the period defined by said start and expiration dates.

7. The security system of claim 1, wherein said means for allowing access to said location includes means for deactivating a lock mechanism for a predetermined time period, said command instructions including a time extension command for altering the amount of time that said lock mechanism is deactivated.

8. The security system of claim 1, further comprising personal identification number (PIN) entry means for transmitting a PIN entered by a key means holder to said controller means, said entered PIN being compared with a previously stored PIN read from said key means memory as part of said validity determination, said command instructions including a PIN override instruction for causing said validity determining means to bypass said PIN comparison in determining whether said key means is valid.

9. The security system of claim 1, wherein said controller means further comprises means for automatically time controlling access to said location, said command instructions including an instruction for overriding said automatic time control means.

10. The security system of claim 1, wherein said specific coded data stored in said key means memory includes the name of an authorized holder of said key means.

11. The security system of claim 1, wherein said means for allowing access to said location comprises means for powering a lock relay to open a door, said controller means further including means for detecting whether said door is propped open or forced, and alarm means for generating an alarm when said door is detected to be propped open or forced.

12. A method of controlling access to a location, comprising the steps of:

storing coded data including a security code and additional validation data and commands related to access requirements specific to an authorized keyholder, in a memory of a key, said additional validation data being specific to said key means;

reading said coded data and commands from said memory; and determining the validity of said key based on the coded data read from said memory and allowing access to said location and responding to said commands to provide a mode of access in accordance with said access requirements when the key is determined to be valid.

13. The method of claim 12, further including the step of writing data into a valid key to control the subsequent use of the key after access has been allowed.

14. The method of claim 12, further including the step of altering the data stored in said key to control the subsequent use of the key after access has been allowed.

15. The security system of claim 7, wherein said time extension command causes said means for deactivating to increase the amount of time that said lock mechanism is deactivated.

16. A security system, comprising:

a plurality of key means for gaining access to a plurality of locations, each of said plurality of key means including a memory having stored therein coded data specific to said key means and command instructions specific to said key means;

a plurality of controllers interconnected by a communication line to a controller programmer, each of said controllers being positioned at a separate location for controlling access to said separate location, wherein each of said controllers comprises means for reading coded data from a memory of a key means presented thereto, a memory table storing a list of codes corresponding to specific key means authorized to have access to the location controlled by said controller, means for determining the validity of said presented key means by comparing coded data read therefrom with said list of codes in said memory table, means for allowing access to said location upon determining said presented key means to be valid, and means for executing command instructions read from said presented key means memory;

wherein said controller programmer polls individual ones of said plurality of controllers for communication therebetween.

* * * * *